United States Patent
Beckner et al.

(10) Patent No.: US 9,845,831 B2
(45) Date of Patent: Dec. 19, 2017

(54) CLUTCH WITH REDUNDANT ENGAGEMENT SYSTEMS

(71) Applicant: Rolls-Royce North American Technologies, Inc., Indianapolis, IN (US)

(72) Inventors: Kevin C. Beckner, Indianapolis, IN (US); Edward C. Rice, Indianapolis, IN (US); John M. Flynn, Edon, OH (US); Andrew D. Copeland, Greenwood, IN (US); Matthew T. Bouton, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 27 days.

(21) Appl. No.: 15/159,178

(22) Filed: May 19, 2016

(65) Prior Publication Data

US 2016/0348735 A1    Dec. 1, 2016

Related U.S. Application Data

(60) Provisional application No. 62/168,160, filed on May 29, 2015.

(51) Int. Cl.
| | |
|---|---|
| *F16D 13/26* | (2006.01) |
| *F16D 23/12* | (2006.01) |
| *F16D 13/24* | (2006.01) |
| *F16D 25/12* | (2006.01) |
| *F16D 48/06* | (2006.01) |
| *F16D 13/58* | (2006.01) |
| *F16D 25/0632* | (2006.01) |

(52) U.S. Cl.
CPC ........... *F16D 13/26* (2013.01); *F16D 13/24* (2013.01); *F16D 13/58* (2013.01); *F16D 23/12* (2013.01); *F16D 25/12* (2013.01); *F16D 48/066* (2013.01); *F16D 25/0632* (2013.01)

(58) Field of Classification Search
None
See application file for complete search history.

(56) References Cited

U.S. PATENT DOCUMENTS

| | | | |
|---|---|---|---|
| 4,226,318 A | 10/1980 | Morgan | |
| 4,688,664 A | 8/1987 | Miller | |
| 4,763,765 A | 8/1988 | Black | |
| 5,105,927 A * | 4/1992 | Frost | ............ F16D 23/06 |
| | | | 192/53.31 |
| 5,377,800 A | 1/1995 | Sperduti et al. | |

(Continued)

FOREIGN PATENT DOCUMENTS

| | | |
|---|---|---|
| DE | 4200998 A1 | 7/1993 |
| DE | 102009047766 A1 | 6/2011 |

(Continued)

OTHER PUBLICATIONS

Extended European Search Report, European Application No. 16170042.2-1756/3104032, dated Jan. 4, 2017, 10 pages.

*Primary Examiner* — Jacob S Scott
*Assistant Examiner* — Timothy M Hannon
(74) *Attorney, Agent, or Firm* — Barnes & Thornburg LLP

(57) ABSTRACT

A clutch for use in a gas turbine engine is disclosed herein. The clutch is adapted to selectively transmit rotation from a first shaft of the clutch to a second shaft of the clutch.

18 Claims, 6 Drawing Sheets

(56) References Cited

U.S. PATENT DOCUMENTS

| | | | |
|---|---|---|---|
| 7,231,845 | B2 | 6/2007 | Klaricic |
| 8,596,436 | B2 | 12/2013 | Grogg et al. |
| 8,763,734 | B2 | 7/2014 | Fetter et al. |
| 8,881,534 | B2 | 11/2014 | Copeland et al. |
| 2004/0159524 | A1 | 8/2004 | Carpenter et al. |
| 2007/0199783 | A1 | 8/2007 | Klaricic |
| 2014/0014457 | A1 | 1/2014 | Settineri et al. |
| 2015/0047943 | A1 | 2/2015 | Park |
| 2015/0292601 | A1* | 10/2015 | Tesar .................. F16D 13/26 475/149 |

FOREIGN PATENT DOCUMENTS

| | | |
|---|---|---|
| DE | 102013011553 A1 | 12/2014 |
| DE | 102013214325 A1 | 1/2015 |
| JP | 63125827 A | 5/1988 |
| JP | 06229432 A | 8/1994 |
| WO | 2006110945 A1 | 10/2006 |

* cited by examiner

CLUTCH WITH REDUNDANT ENGAGEMENT SYSTEMS

CROSS REFERENCE TO RELATED APPLICATIONS

This application claims priority to and the benefit of U.S. Provisional Patent Application No. 62/168,160, filed 29 May 2015, the disclosure of which is now expressly incorporated herein by reference.

FIELD OF THE DISCLOSURE

The present disclosure relates generally to clutches, and more specifically to hydraulically-actuated clutches.

BACKGROUND

Hydraulically-actuated clutches are often used to transmit rotation from one component (e.g., a driving component) to another component (e.g., a driven component). The size and materials of construction of some hydraulically-actuated clutches may limit their desirability. Additionally, the desirability of hydraulically-actuated clutches that provide only one engagement system to transmit rotation from one component to another component may be limited.

SUMMARY

The present disclosure may comprise one or more of the following features and combinations thereof.

According to one aspect of the present disclosure, a clutch may comprise a first shaft, a second shaft, a primary engagement system, and a secondary engagement system. The primary engagement system may be configured to selectively transmit rotation from the first shaft to the second shaft. The primary engagement system may include a first frustoconical engagement member coupled for common rotation with the first shaft, and a second frustoconical engagement member coupled for common rotation with the second shaft. The secondary engagement system may be configured to selectively transmit rotation from the first shaft to the second shaft. The secondary engagement system may include first shaft splines coupled to the first shaft for movement therewith, and second shaft splines coupled to the second shaft for movement therewith. The second frustoconical engagement member of the primary engagement system may be coupled to the second shaft to slide relative to the second shaft from a first position disengaged from the first frustoconical engagement member to a second position engaged with the first frustoconical engagement member.

In some embodiments, the second shaft splines may be mounted to slide with the second shaft from a first position disengaged from the first shaft splines to a second position engaged with the first shaft splines. Additionally, in some embodiments, the primary engagement system may include slide splines coupled to the second frustoconical engagement member for movement therewith. The slide splines may be intermeshed with the second shaft splines to couple the second frustoconical engagement member to the second shaft for rotation therewith while allowing the second frustoconical engagement member to slide relative to the second shaft. The second frustoconical engagement member may form an internal engagement surface that contacts the first frustoconical engagement member when the second frustoconical engagement member is in the second position.

In some embodiments, the first shaft splines may be internal splines and the second shaft splines may be external splines. The primary engagement system may include internal slide splines coupled to the second frustoconical engagement member for movement therewith. The internal slide splines may be intermeshed with the second shaft splines to couple the second frustoconical engagement member to the second shaft for rotation therewith while allowing the second frustoconical engagement member to slide relative to the second shaft.

In some embodiments, the first frustoconical engagement member may be integrally formed with the first shaft. Additionally, in some embodiments, the first frustoconical engagement member, the first shaft, and the first shaft splines may be integrally formed with one another.

According to another aspect of the present disclosure, a clutch may comprise a first shaft, a second shaft, a primary engagement system, and a secondary engagement system. The primary engagement system may be configured to selectively transmit rotation from the first shaft to the second shaft. The primary engagement system may include a first frustoconical engagement member coupled for common rotation with the first shaft, a second frustoconical engagement member coupled for common rotation with the second shaft, and a primary engagement system actuator coupled to the second frustoconical engagement member. The primary engagement system actuator may be configured to move the second frustoconical engagement member from a de-actuated position disengaged from the first frustoconical engagement member to an actuated position engaged with the first frustoconical engagement member. The secondary engagement system may be configured to selectively transmit rotation from the first shaft to the second shaft. The secondary engagement system may include first shaft splines coupled to the first shaft for movement therewith, second shaft splines coupled to the second shaft for movement therewith, and a secondary engagement system actuator coupled to the second shaft. The secondary engagement system actuator may be configured to move the second shaft splines from a de-actuated position disengaged from the first shaft splines to an actuated position engaged with the first shaft splines.

In some embodiments, the primary engagement system actuator and the secondary engagement system actuator may be independent of one another so that the second frustoconical engagement member and the second shaft splines are movable between their respective de-actuated and actuated positions independently of one another. Additionally, in some embodiments, the first frustoconical engagement member may be integrally formed with the first shaft, and the first shaft splines may be arranged radially inward of the first frustoconical engagement member.

In some embodiments, the second frustoconical engagement member may be coupled to the second shaft to slide relative to the second shaft. The primary engagement system may include slide splines coupled to the second frustoconical engagement member for movement therewith. The slide splines may be intermeshed with the second shaft splines to couple the second frustoconical engagement member to the second shaft for rotation therewith while allowing the second frustoconical engagement member to slide relative to the second shaft. Additionally, in some embodiments, the first shaft splines may be internal splines and the second shaft splines may be external splines. The primary engagement system may include internal slide splines coupled to the second frustoconical engagement member for movement therewith. The internal slide splines may be intermeshed with the second shaft splines to couple the second frustoconical engagement member to the second shaft for rotation therewith while allowing the second frustoconical engagement member to slide relative to the second shaft.

According to yet another aspect of the present disclosure, a transmission may comprise a source of hydraulic fluid, a first shaft, a second shaft, a frictional engagement system, a fixed engagement system, and a controller. The frictional engagement system may be configured to selectively transmit rotation from the first shaft to the second shaft. The frictional engagement system may include a first engagement member coupled for common rotation with the first shaft, a second engagement member coupled for common rotation with the second shaft, and a frictional engagement system actuator coupled to the second engagement member. The frictional engagement system actuator may be configured to move the second engagement member from a de-actuated position disengaged from the first engagement member to an actuated position engaged with the first engagement member. The fixed engagement system may be configured to selectively transmit rotation from the first shaft to the second shaft. The fixed engagement system may include first shaft splines coupled to the first shaft for movement therewith, second shaft splines coupled to the second shaft for movement therewith, and a fixed engagement system actuator coupled to the second shaft. The fixed engagement system actuator may be configured to move the second shaft splines from a de-actuated position disengaged from the first shaft splines to an actuated position engaged with the first shaft splines. The controller may include a processor and memory. The memory may have instructions stored therein that are executable by the processor to pressurize hydraulic fluid supplied by the source to cause at least one of the (i) the frictional engagement system actuator to move from the de-actuated position to the actuated position and (ii) the fixed engagement system actuator to move from the de-actuated position to the actuated position.

In some embodiments, the memory may include instructions that are executable by the processor to pressurize hydraulic fluid supplied by the source to cause the frictional engagement system actuator to move from the de-actuated position to the actuated position to synchronize rotation of the first and second shafts. The memory may also include instructions that are executable by the processor to pressurize hydraulic fluid supplied by the source to cause the fixed engagement system actuator to move from the de-actuated position to the actuated position to lock the first and second shafts together upon synchronization of the first and second shafts after movement of the second engagement member to the actuated position. The memory may include instructions that are executable by the processor to pressurize hydraulic fluid supplied by the source to cause the frictional engagement system actuator to move from the actuated position to the de-actuated position after movement of the second shaft splines to the actuated position.

In some embodiments, the frictional engagement system actuator may be constrained against rotation with the second engagement member, and the fixed engagement system actuator may be constrained against rotation with the second shaft. Additionally, in some embodiments, the first engagement member may comprise a first frustoconical engagement member, and the second engagement member may comprise a second frustoconical engagement member.

These and other features of the present disclosure will become more apparent from the following description of the illustrative embodiments.

DETAILED DESCRIPTION OF THE DRAWINGS

Figure 1:
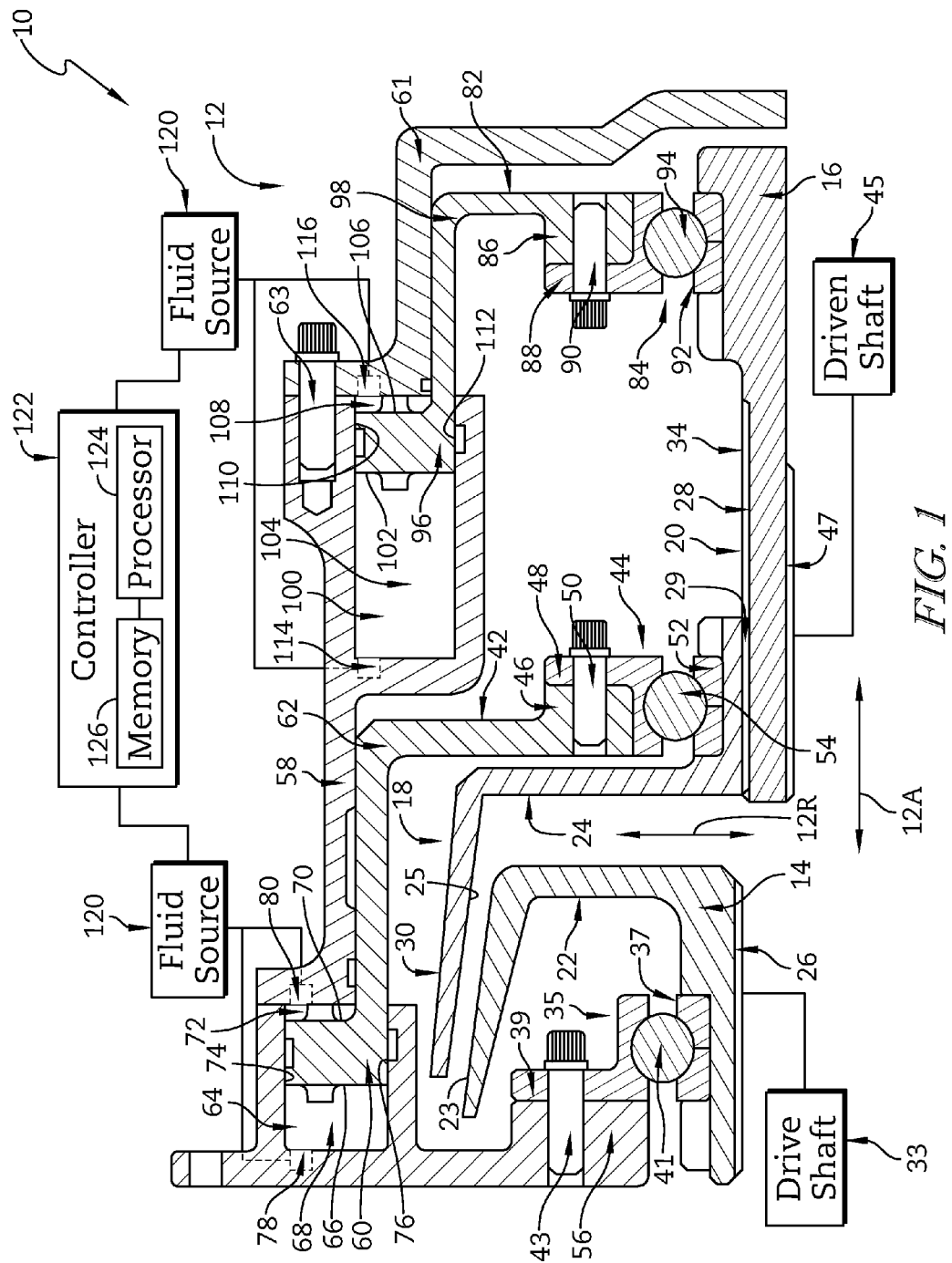
FIG. 1 is a cross-sectional view of a clutch included in a transmission adapted for use in a gas turbine engine that includes a controller and a fluid source shown in diagrammatic form.

For the purposes of promoting an understanding of the principles of the disclosure, reference will now be made to a number of illustrative embodiments illustrated in the drawings and specific language will be used to describe the same.

Referring now to FIG. 1, a transmission 10 configured to selectively transmit rotation from one component to another component is shown. In the illustrative embodiment, the transmission 10 is configured for use in a gas turbine engine. In other embodiments, however, the transmission 10 may be configured for use in other applications.

The transmission 10 illustratively includes a mechanical clutch 12 as shown in FIG. 1. The clutch 12 includes a first shaft 14, a second shaft 16, a primary (friction-cone) engagement system 18, and a secondary (splined) engagement system 20. Each of the primary and secondary engagement systems 18, 20 is configured to selectively transmit rotation from the first shaft 14 to the second shaft 16. In this way, the engagement systems 18, 20 provide redundant means for transmitting rotation from the first shaft 14 to the second shaft 16 so that in the event that one of the engagement systems 18, 20 fails connection of the first shaft 14 to the second shaft 16 is maintained.

Figure 3:
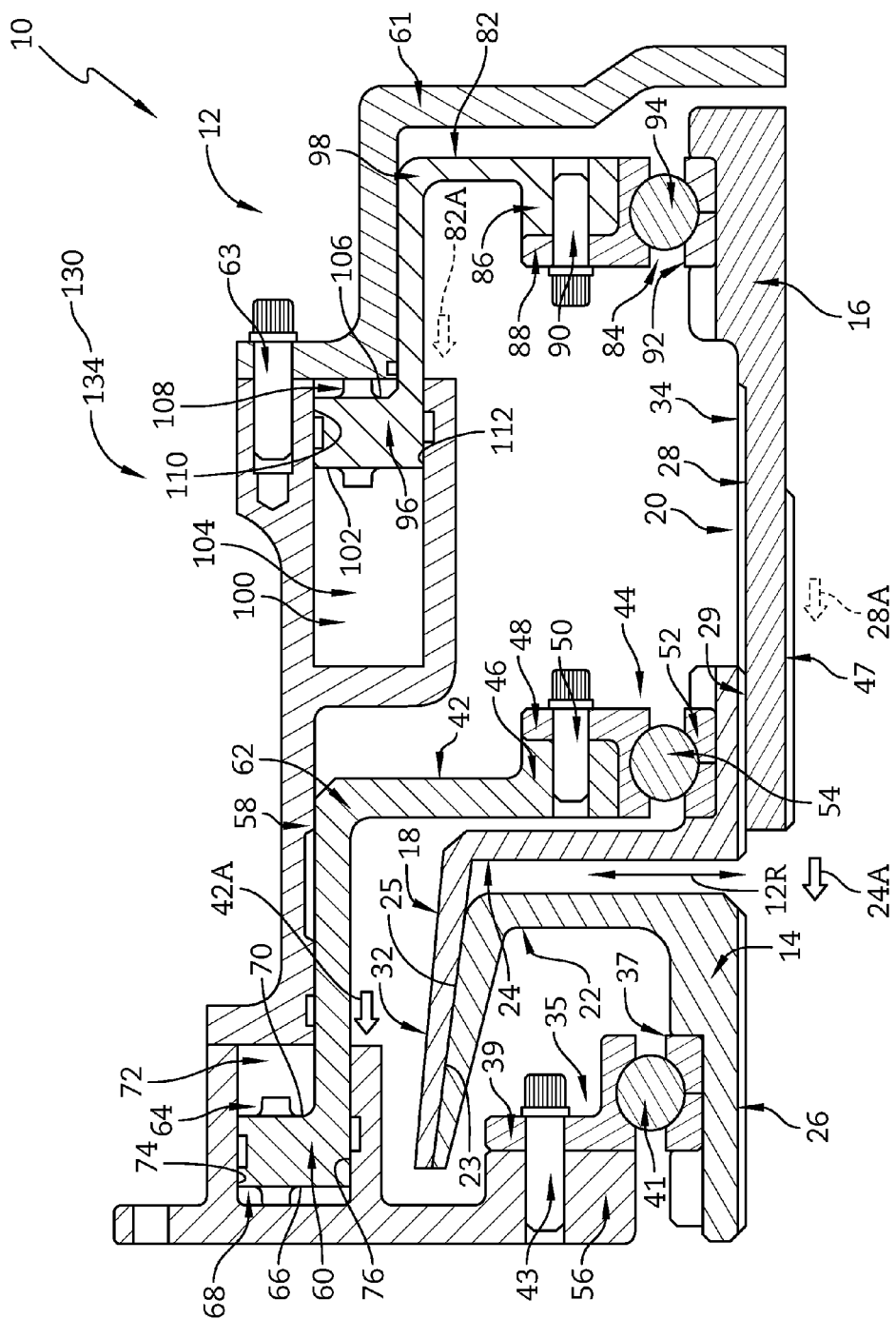
FIG. 3 is a cross-sectional view of the clutch of FIG. 1 showing the secondary (splined) engagement system in the disengaged state and the primary (friction-cone) engagement system in an engaged state in which rotation is transmitted from the first shaft to the second shaft by frustoconical engagement members included in the primary engagement system.

The primary (friction-cone) engagement system 18 is configured to synchronize rotation of the first and second shafts 14, 16 when partially engaged and to transmit rotation from the first shaft 14 to the second shaft 16 when fully engaged as shown in FIG. 3. Rotation is transmitted from the first shaft 14 to the second shaft 16 by the primary engagement system 18 as the result of frictional contact between components of the primary engagement system 18. The primary engagement system 18 may therefore be said to be a frictional engagement system.

The primary engagement system 18 has a first frustoconical engagement member 22 that is coupled for common rotation with the first shaft 14 as shown in FIG. 1. Additionally, the primary engagement system 18 has a second frustoconical engagement member 24 that is coupled for common rotation with the second shaft 16. When the engagement members 22, 24 are brought into frictional contact with one another, rotation is transmitted from the first shaft 14 to the second shaft 16 by the primary engagement system 18.

The second frustoconical engagement member 24 of the primary engagement system 18 is coupled to the second shaft 16 to slide relative thereto as shown in FIG. 1. Specifically, the second engagement member 24 is coupled to the second shaft 16 to slide relative thereto from a de-actuated position 30 (shown in FIGS. 1-2) to an actuated position 32 (shown in FIGS. 3-4). The second engagement member 24 is disengaged from the frustoconical engagement member 22 in the de-actuated position 30. As such, rotation is not transmitted from the first shaft 14 to the second shaft 16 by the primary engagement system 18 in the de-actuated position 30. In contrast, the second engagement member 24 is engaged with the engagement member 22 in the actuated position 32 to synchronize rotation of the first and second shafts 14, 16. Rotation is therefore transmitted from the first shaft 14 to the second shaft 16 by the primary engagement system 18 in the actuated position 32.

Figure 4:
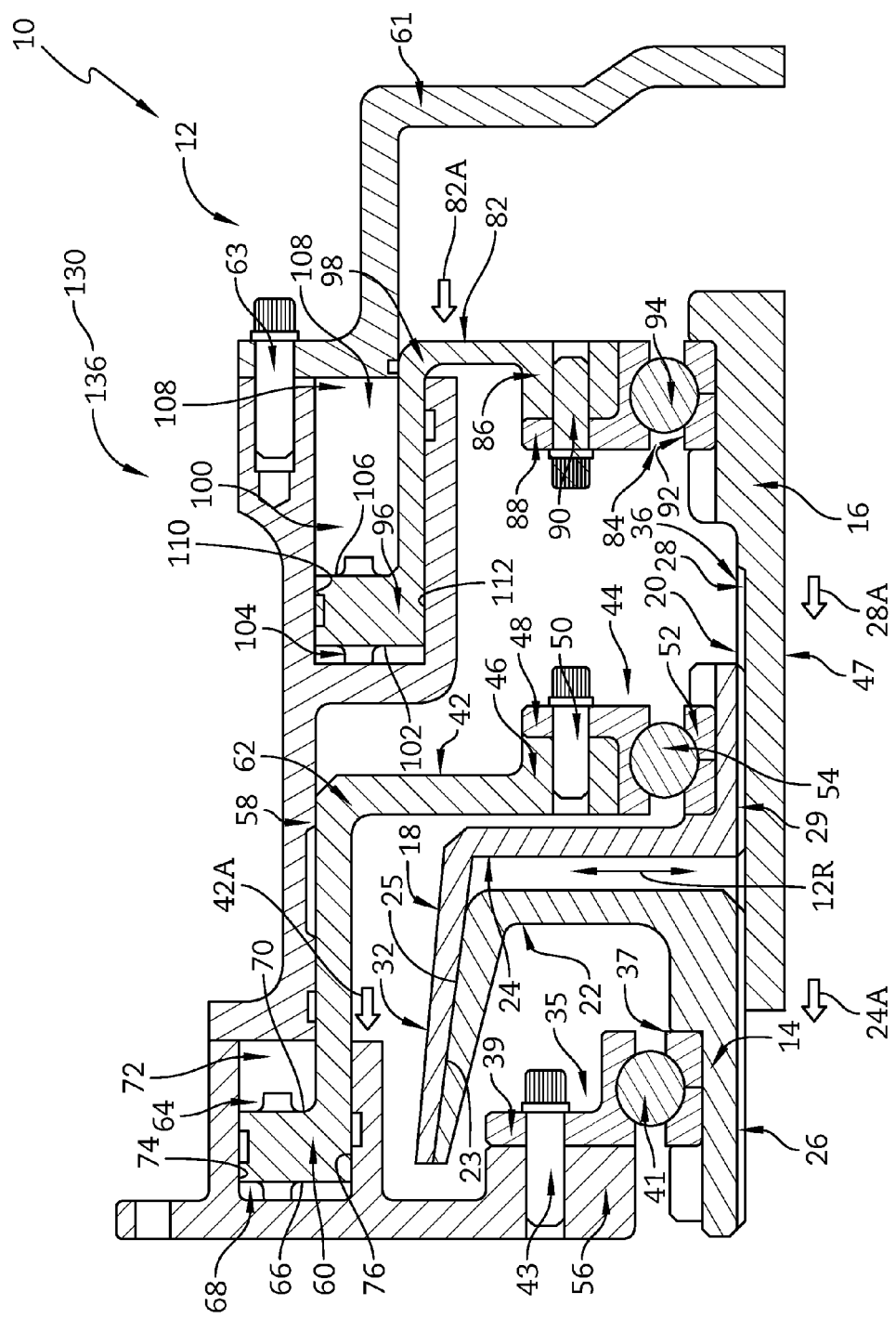
FIG. 4 is a cross-sectional view of the clutch of FIG. 1 showing the primary (friction-cone) engagement system in the engaged state and the secondary (splined) engagement system in an engaged state in which rotation is transmitted from the first shaft to the second shaft by splines included in the secondary engagement system.

The secondary (splined) engagement system 20 is configured to lock the first shaft 14 and the second shaft 16 together for common rotation with one another as shown in FIG. 4. Rotation is transmitted from the first shaft 14 to the second shaft 16 by the secondary engagement system 20 as the result of splined engagement between components of the engagement system 20. The secondary engagement system 20 may therefore be said to be a splined or fixed engagement system.

The secondary engagement system 20 has first shaft splines 26 that are coupled to the first shaft 14 for movement therewith as shown in FIG. 1. Additionally, the secondary engagement system 20 has second shaft splines 28 that are coupled to the second shaft 16 for movement therewith. When the first shaft splines 26 are brought into engagement with the second shaft splines 28, rotation is transmitted from the first shaft 14 to the second shaft 16 by the secondary engagement system 20.

The second shaft splines 28 of the secondary engagement system 20 are illustratively mounted to the second shaft 16 to slide therewith as shown in FIG. 1. Specifically, the second shaft splines 28 are mounted to the second shaft 16 to slide therewith from a de-actuated position 34 (shown in FIGS. 1-3) to an actuated position 36 (shown in FIG. 4). The second shaft splines 28 are disengaged from the first shaft splines 26 in the de-actuated position 34. As such, rotation is not transmitted from the first shaft 14 to the second shaft 16 by the secondary engagement system 20 in the de-actuated position 34. In contrast, the second shaft splines 28 are engaged with the first shaft splines 26 in the actuated position 36 to lock the shafts 14, 16 together for common rotation with one another. Rotation is therefore transmitted from the first shaft 14 to the second shaft 16 by the secondary engagement system 20 in the actuated position 36.

The first frustoconical engagement member 22, the first shaft 14, and the first shaft splines 26 are illustratively integrally formed with one another as shown in FIG. 1. The splines 26 are arranged inward of the engagement member 22 in a radial direction indicated by arrow 12R.

In other embodiments, however, one or more of the frustoconical engagement member 22, the first shaft 14, and the first shaft splines 26 may be separately formed from the other of the engagement member 22, the shaft 14, and the splines 26. In one example, the engagement member 22 and the shaft 14 may be separately formed components. In another example, the engagement member 22 may be integrally formed with the shaft 14, and the splines 26 may be separately formed from the engagement member 22 and the shaft 14.

The second frustoconical engagement member 24 is illustratively positioned outward in the radial direction indicated by arrow 12R of the first frustoconical engagement member 22 as shown in FIG. 1. The second frustoconical engagement member 24 includes a frustoconical, internal engagement surface 25 that is configured to engage a frustoconical, external engagement surface 23 of the first frustoconical engagement member 22. When the second engagement member 24 is in the actuated position 32, the internal engagement surface 25 contacts the external engagement surface 23 such that the surfaces 23, 25 apply frictional forces to one another. The frictional forces synchronize rotation of the members 22, 24 and thus the respective shafts 14, 16, so that the rotational speeds of the shafts 14, 16 approach one another. The synchronized rotation of the shafts 14, 16 allows rotation from the shaft 14 to be transmitted to the shaft 16 by the primary engagement system 18.

The primary engagement system 18 illustratively includes slide splines 29 that are coupled to the second frustoconical engagement member 24 for movement therewith as shown in FIG. 1. As the second; engagement member 24 moves from the de-actuated position 30 to the actuated position 32, the slide splines 29 are intermeshed with the second shaft splines 28 included in the second (splined) engagement system 20. In this way, the second engagement member 24 is coupled to the second shaft 16 for rotation therewith while being allowed to slide relative to the second shaft 16 from the de-actuated position 30 to the actuated position 32. The slide splines 29 are illustratively internal splines, but in other embodiments, the slide splines 29 may be external splines.

In the illustrative embodiment, the first shaft splines 26 of the secondary engagement system 20 are internal splines and the second shaft splines 28 are external splines as shown in FIG. 1. In other embodiments, however, the splines 26 may be external splines, and the second splines 28 may be internal splines. When the splines 28 are engaged with the splines 26 in the actuated position 36, the first shaft 14 is locked to the second shaft 16 so that the rotational speeds of the shafts 14, 16 are substantially the same. Locking of the shafts 14, 16 allows rotation from the shaft 14 to be transmitted to the shaft 16 by the secondary engagement system 20.

The first shaft 14 and the first frustoconical engagement member 22 are illustratively coupled for common rotation with a drive shaft 33 as shown in FIG. 1. The shaft 14 and the engagement member 22 are supported for rotation with the drive shaft 33 relative to a stationary element 56 by a bearing 35. The shaft 14 and the engagement member 22 are coupled to an inner race 37 of the bearing 35. The inner race 37 is coupled to an outer race 39 of the bearing 35 through a plurality of balls 41 (one of which is shown in FIG. 1) that are engaged with the inner and outer races 37, 39. The outer race 39 is coupled to the stationary element 56 by a fastener 43.

The second shaft 16 and the second frustoconical engagement member 24 are illustratively coupled for common rotation with a driven shaft 45 as shown in FIG. 1. The shaft 16 includes driven splines 47 that are configured to couple to the driven shaft 45. The driven splines 47 are illustratively internal splines that are positioned inward in the radial direction indicated by arrow 12R of the second shaft splines 28. In other embodiments, however, the driven splines 47 may be external splines.

In the illustrative embodiment, rotation from the drive shaft 33 is selectively transmitted by the primary and secondary engagement systems 18, 20 to the driven shaft 45 through the first and second shafts 14, 16 as suggested by FIG. 1. In other embodiments, however, rotation may be selectively transmitted by the engagement systems 18, 20 between the shafts 33, 45 in a different fashion. For example, rotation from the shaft 45 may be selectively transmitted by the engagement systems 18, 20 to the shaft 33 through the shafts 14, 16.

The primary and secondary engagement systems 18, 20 provide redundant engagement systems of the clutch 12 as suggested by FIG. 1. In the event of a failure of the engagement system 18, the engagement system 20 may be used to transmit rotation from the drive shaft 33 to the driven shaft 45 through the first and second shafts 14, 16. Conversely, in the event of a failure of the engagement system 20, the engagement system 18 may be used to transmit rotation from the shaft 33 to the shaft 45 through the shafts 14, 16.

In the illustrative embodiment, each of the primary and secondary engagement systems 18, 20 are hydraulically-actuated engagement systems as suggested by FIG. 1. The clutch 12 is therefore illustratively embodied as a hydraulically-actuated clutch. In other embodiments, however, the clutch 12 may be embodied as a pneumatically-actuated clutch or an electromagnetically-actuated clutch. The hydraulically-actuated components of the engagement systems 18, 20 are described in greater detail below.

Figure 2:
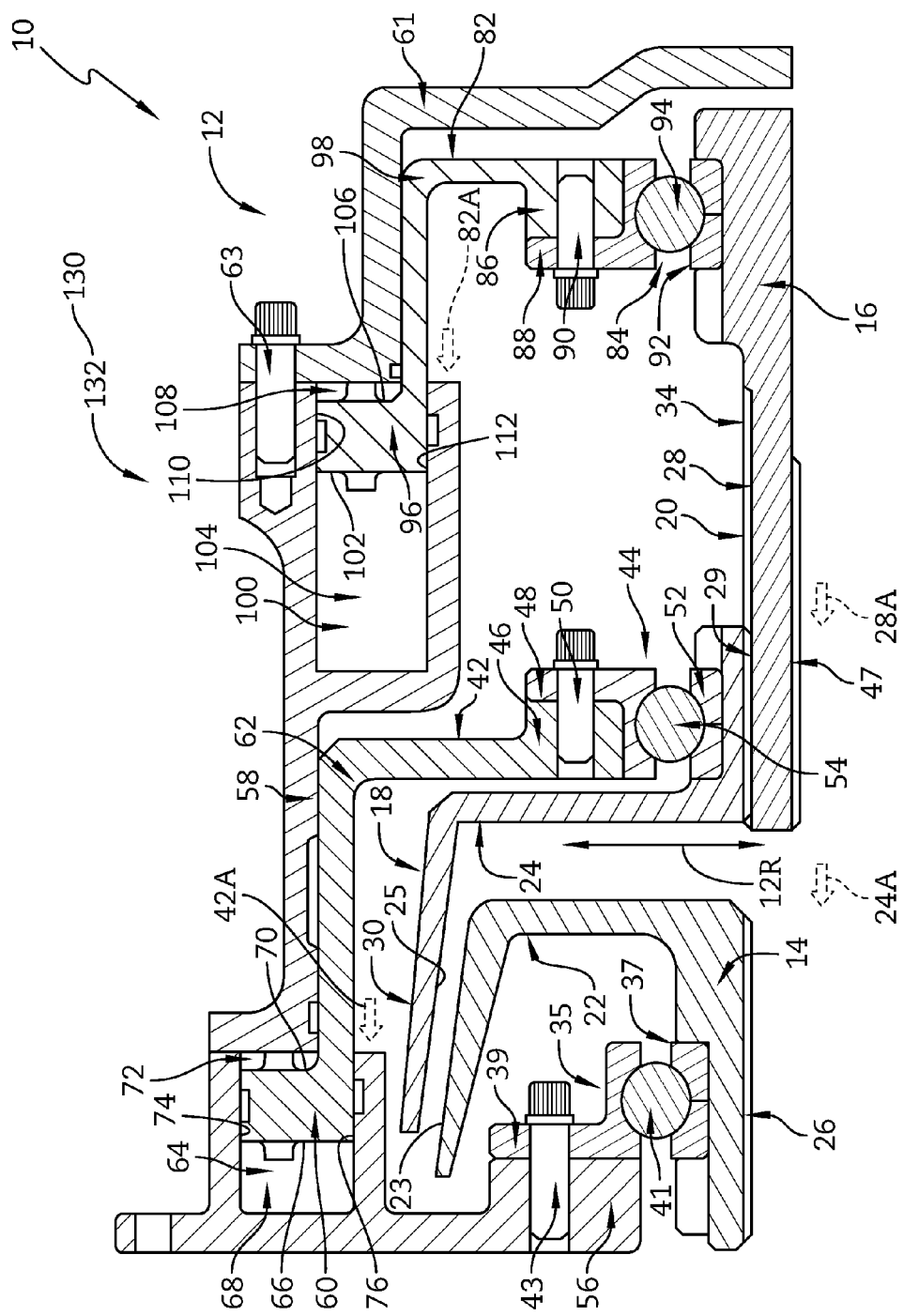
FIG. 2 is a cross-sectional view of the clutch of FIG. 1 showing a primary (friction-cone) engagement system of the clutch in a disengaged state in which rotation is not transmitted from a first shaft to a second shaft by frustoconical engagement members coupled to the first and second shafts and a secondary (splined) engagement system of the clutch in a disengaged state in which rotation is not transmitted from the first shaft to the second shaft by splines coupled to the first and second shafts.

The primary engagement system 18 illustratively includes a primary engagement system actuator 42, also referred to as a frictional engagement system actuator, as shown in FIG. 1. The actuator 42 is configured to move in a direction indicated by arrow 42A in response to hydraulic fluid pressure applied to the actuator 42 as best seen in FIGS. 2-4. The actuator 42 is coupled to the second frustoconical engagement member 24 to move the member 24 from the de-actuated position 30 to the actuated position 32 in a direction indicated by arrow 24A as best seen in FIGS. 2-4.

The primary engagement system actuator 42 is coupled to the second frustoconical engagement member 24 through a bearing 44 as shown in FIG. 1. A portion 46 of the engagement system actuator 42 is coupled to an outer race 48 of the bearing 44 by a fastener 50. The outer race 48 is coupled to an inner race 52 of the bearing 44 through a plurality of balls 54 (one of which is shown in FIG. 1) that are engaged with the inner and outer races 52, 48. The inner race 52 is coupled directly to the engagement member 24. The bearing 44 supports the engagement member 24 for rotation relative to the engagement system actuator 42.

The primary engagement system actuator 42 is engaged with stationary elements 56, 58 that are coupled to one another as shown in FIG. 1. A portion 60 of the actuator 42 that is positioned outward of the portion 46 in the radial direction indicated by arrow 12R is engaged with the stationary element 56. A portion 62 of the actuator 42 that interconnects the portions 46, 60 and is positioned outward of the portion 46 in the radial direction indicated by arrow 12R is engaged with the element 58. Engagement of the portions 60, 62 with the elements 56, 58 constrains the actuator 42 against rotation with the second frustoconical engagement member 24.

The portion 60 of the primary engagement system actuator 42 is received in a channel 64 that is cooperatively defined by the stationary elements 56, 58 as shown in FIG. 1. A wall 66 of the portion 60 is spaced from the element 56 to define a fluid chamber 68 therebetween. A wall 70 of the portion 60 that is positioned opposite the wall 66 is spaced from the element 58 to define a fluid chamber 72 therebetween. Each of the chambers 68, 72 is positioned outward in the radial direction indicated by arrow 12R of the bearings 35, 44. A wall 74 of the portion 60 that interconnects the walls 66, 70 is engaged with the element 56. A wall 76 of the portion 60 that interconnects the walls 66, 70 and is positioned opposite the wall 74 is also engaged with the element 56.

As best seen in FIGS. 2-3, engagement of the walls 74, 76 with the stationary element 56 guides movement of the primary engagement system actuator 42 within the channel 64. As the actuator 42 moves in the direction indicated by arrow 42A (see FIG. 3), the second frustoconical engagement member 24 moves in the direction indicated by arrow 24A from the de-actuated position 30 toward the actuated position 32. When the actuator 42 is constrained against further movement in the direction indicated by arrow 42A (see FIG. 3), the engagement member 42 is in the actuated position 32.

The fluid chamber 68 is fluidly coupled to a port 78 that is formed in the stationary element 56 as shown in FIG. 1. The fluid chamber 72 is fluidly coupled to a port 80 that is formed in the stationary element 58. Hydraulic fluid delivered to the chamber 72 through the port 80 applies pressure to the primary engagement system actuator 42 to cause the actuator 42 to move in the direction indicated by arrow 42A. At the same time, the second frustoconical engagement member 24 moves with the actuator 42 in the direction indicated by arrow 24A from the de-actuated position 30 toward the actuated position 32. Hydraulic fluid delivered to the chamber 68 through the port 78 applies pressure to the actuator 42 to cause the actuator 42 to move in a direction opposite to the direction indicated by arrow 42A. As a result, the engagement member 24 moves with the actuator 42 in a direction opposite to the direction indicated by arrow 24A from the position 32 toward the position 30.

The secondary engagement system 20 illustratively includes a secondary engagement system actuator 82, also referred to as a fixed engagement system actuator, as shown in FIG. 1. The actuator 82 is configured to move in a direction indicated by arrow 82A in response to hydraulic fluid pressure applied to the actuator 82 as best seen in FIGS. 2-4. The actuator 82 is coupled to the second shaft splines 28 to move the splines 28 from the de-actuated position 34 to the actuated position 36 in a direction indicated by arrow 28A as best seen in FIGS. 2-4.

The secondary engagement system actuator 82 is coupled to the second shaft 16, and thus the second shaft splines 28, through a bearing 84 as shown in FIG. 1. A portion 86 of the actuator 82 is coupled to an outer race 88 of the bearing 84 by a fastener 90. The outer race 88 is coupled to an inner race 92 of the bearing 84 through a plurality of balls 94 (one of which is shown in FIG. 1) that are engaged with the inner and outer races 92, 88. The inner race 92 is coupled directly to the shaft 16. The bearing 84 supports the shaft 16 for rotation relative to the actuator 82.

The secondary engagement system actuator 82 is engaged with stationary elements 58, 61 that are coupled to one another by a fastener 63 as shown in FIG. 1. A portion 96 of the actuator 82 that is positioned outward of the portion 86 in the radial direction indicated by arrow 12R is engaged with the element 58. A portion 98 of the actuator 82 that interconnects the portions 86, 96 and is positioned outward of the portion 86 in the radial direction indicated by arrow 12R is engaged with the element 61. Engagement of the portions 96, 98 with the elements 58, 61 constrains the actuator 82 against rotation with the second shaft 16.

The portion 96 of the secondary engagement system actuator 82 is received in a channel 100 that is cooperatively defined by the stationary elements 58, 61 as shown in FIG. 1. A wall 102 of the portion 96 is spaced from the element 58 to define a fluid chamber 104 therebetween. A wall 106 of the portion 96 that is positioned opposite the wall 102 is spaced from the element 61 to define a fluid chamber 108 therebetween. Each of the chambers 104, 108 is positioned outward in the radial direction indicated by arrow 12R of the bearings 35, 44, 84. A wall 110 of the portion 96 that interconnects the walls 102, 106 is engaged with the element 58. A wall 112 of the portion 96 that interconnects the walls 102, 106 and is positioned opposite the wall 110 is also engaged with the element 58.

As best seen in FIGS. 3-4, engagement of the walls 110, 112 with the stationary element 58 guides movement of the secondary engagement system actuator 82 within the channel 100. As the actuator 82 moves in the direction indicated by arrow 82A (see FIG. 4), the second shaft splines 28 move in the direction indicated by arrow 28A from the de-actuated position 34 toward the actuated position 36. When the actuator 82 is constrained against further movement in the direction indicated by arrow 82A (see FIG. 4), the splines 28 are in the actuated position 36.

The fluid chamber 104 is fluidly coupled to a port 114 that is formed in the stationary element 58 as shown in FIG. 1. The fluid chamber 108 is fluidly coupled to a port 116 that is formed in the stationary element 61. Hydraulic fluid delivered to the chamber 108 through the port 116 applies pressure to the secondary engagement system actuator 82 to cause the actuator 82 to move in the direction indicated by arrow 82A. At the same time, the second shaft splines 28 move with the actuator 82 in the direction indicated by arrow 28A from the de-actuated position 34 toward the actuated position 36. Hydraulic fluid delivered to the chamber 104 through the port 114 applies pressure to the actuator 82 to cause the actuator 82 to move in a direction opposite to the direction indicated by arrow 82A. As a result, the splines 28 move with the actuator 82 in a direction opposite to the direction indicated by arrow 28A from the position 36 toward the position 34.

The primary and secondary engagement system actuators 42, 82 are movable within their respective channels 64, 100 independently of one another as shown in FIG. 1. As such, the second frustoconical engagement member 24 is movable between the de-actuated and actuated positions 30, 32 independently of movement of the second shaft splines 28 between the de-actuated and actuated positions 34, 36.

Components of each of the primary and secondary engagement systems 18, 20 may be constructed of metallic materials. Alternatively, components of each of the systems 18, 20 may be constructed of polymeric materials. In one example, components of each of the systems 18, 20 may be constructed of the polymeric material PEEK®. In another example, components of each of the systems 18, 20 may be constructed of the polymeric material AURUM®. Components of each of the systems 18, 20 may include nano-crystalline coatings deposited thereon, such as nano-crystalline coatings containing nickel or cobalt-based alloys.

The transmission 10 illustratively includes a hydraulic fluid source 120 as shown in FIG. 1. The fluid source 120 is fluidly coupled to the ports 78, 80, 114, 116. Hydraulic fluid supplied by the fluid source 120 is selectively delivered to the primary engagement system actuator 42 to cause the second frustoconical engagement member 24 to move from the de-actuated position 30 to the actuated position 32. Hydraulic fluid supplied by the fluid source 120 is selectively delivered to the secondary engagement system actuator 82 to cause the second shaft splines 28 to move from the de-actuated position 34 to the actuated position 36.

The transmission 10 illustratively includes a controller 122 that is coupled to the fluid source 120 as shown in FIG. 1. The controller 122 may be coupled to the fluid source 120 through one or more solenoid valves that are configured to deliver fluid from the fluid source 120 to each of the ports 78, 80, 114, 116 in response to electrical signals provided to the solenoid valve(s) by the controller 122. The solenoid valve(s) may be included in an electro-hydraulic control system of the transmission 10.

The controller 122 includes a processor 124 and memory 126 coupled to the processor 124. The memory 126 includes instructions stored therein that are executable by the processor 124 to cause a number of activities to take place, as described in greater detail below with respect to operation of the transmission 10.

Referring now to FIGS. 2-5, operation of the transmission 10 will now be described. The transmission 10 is illustratively operable in a plurality of operating modes 130. In one operating mode 132 shown in FIG. 2, rotation from the drive shaft 33, and thus the first shaft 14, is not transmitted to the second shaft 16, and thus the driven shaft 45. In another operating mode 134 shown in FIG. 3, rotation from the drive shaft 33 is transmitted to the driven shaft 45 through the shafts 14, 16 by the primary engagement system 18. In yet another operating mode 136 shown in FIG. 4, rotation from the drive shaft 33 is transmitted to the driven shaft 45 through the shafts 14, 16 by the primary and secondary engagement systems 18, 20. In yet another operating mode 138 still shown in FIG. 5, rotation from the drive shaft 33 is transmitted to the driven shaft 45 through the shafts 14, 16 by the secondary engagement system 20.

Referring now to FIG. 2, the transmission 10 is shown in the operating mode 132. In the mode 132, though hydraulic fluid from the fluid source 120 is present in the fluid chamber 72, the hydraulic fluid has not been pressurized, and therefore the primary engagement system actuator 42 has not moved in the direction indicated by arrow 42A. As a result, the second frustoconical engagement member 24 is in the de-actuated position 30. Additionally, in the mode 132, though hydraulic fluid from the source 120 is present in the fluid chamber 108, the hydraulic fluid has not been pressurized, and therefore the secondary engagement system actuator 82 has not moved in the direction indicated by arrow 82A. Consequently, the second shaft splines 28 are in the de-actuated position 34.

Referring now to FIG. 3, the transmission 10 is shown in the operating mode 134. In the mode 134, the instructions stored in the memory 126 are executed by the processor 124 to pressurized hydraulic fluid from the fluid source 120 present in the chamber 72. Fluid pressure applied to the primary engagement system actuator 42 in the chamber 72 causes the actuator 42 to move in the direction indicated by arrow 42A, thereby causing the second frustoconical engagement member 24 to move in the direction indicated by arrow 24A to the actuated position 32. Additionally, in the mode 134, the hydraulic fluid from the source 120 present in the chamber 108 has not been pressurized, and therefore the secondary engagement system actuator 82 has not moved in the direction indicated by arrow 82A. Consequently, the second shaft splines 28 are in the de-actuated position 34.

Referring now to FIG. 4, the transmission 10 is shown in the operating mode 136. In the mode 136, the second frustoconical engagement member 24 remains in the actuated position 32 attained in the operating mode 134. Additionally, in the mode 136, the instructions stored in the memory 126 are executed by the processor 124 to pressurize hydraulic fluid from the fluid source 120 present in the fluid chamber 108 in response to movement of the member 24 to the position 32. Fluid pressure applied to the secondary engagement system actuator 82 in the chamber 108 causes the actuator 82 to move in the direction indicated by arrow 82A, thereby causing the second shaft splines 28 to move in the direction indicated by arrow 28A to the actuated position 36.

In the illustrative embodiment, the instructions stored in the memory 126 are executed by the processor 124 to cause hydraulic fluid to be expelled from the fluid chamber 72 in response to movement of the second shaft splines 28 to the actuated position 36 as shown in FIG. 4. In other embodiments, however, hydraulic fluid contained in the chamber 72 may remain therein when the splines 28 attain the position 36.

Figure 5:
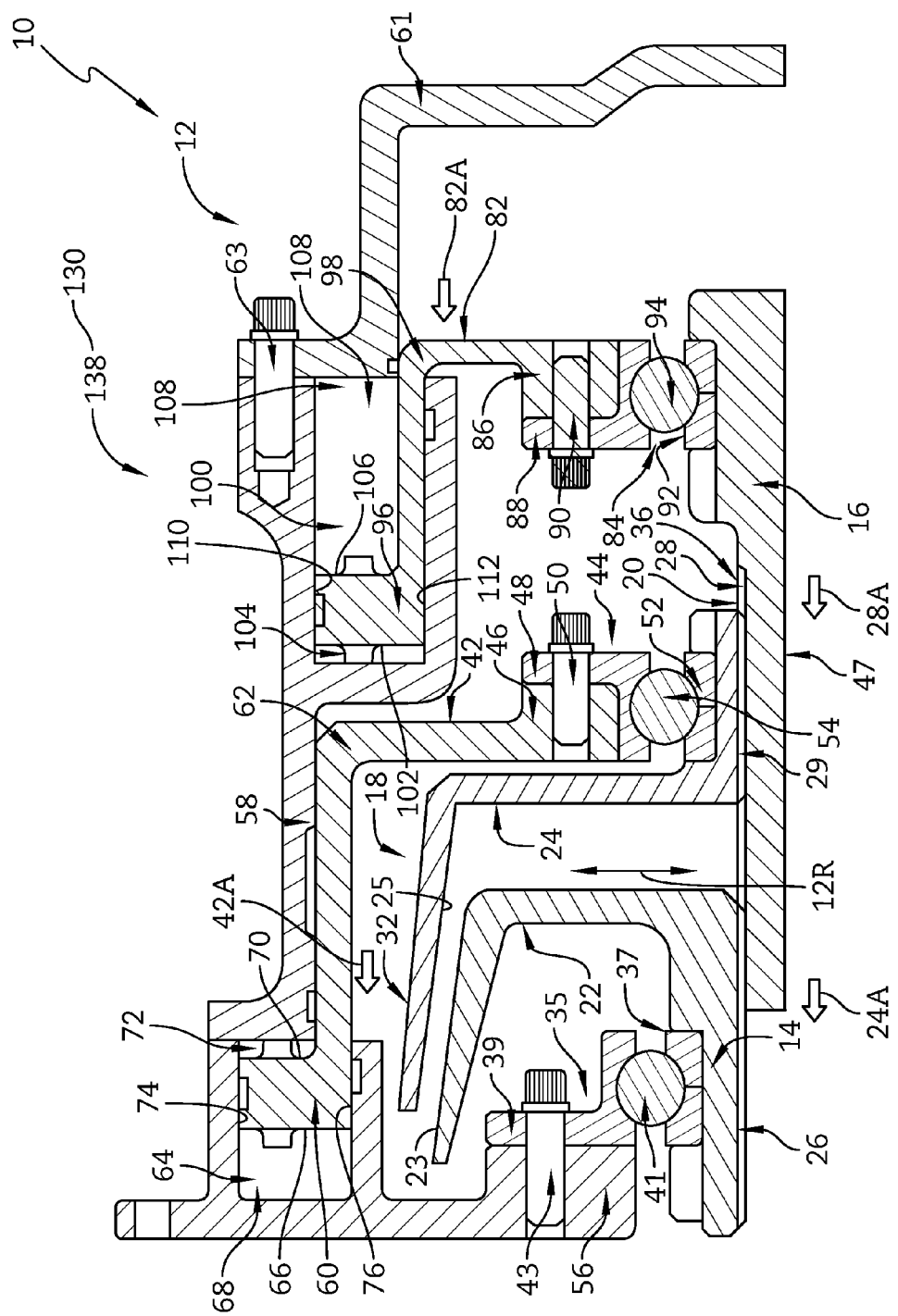
FIG. 5 is a cross-sectional view of the clutch of FIG. 1 showing the primary (friction-cone) engagement system in the disengaged state and the secondary (splined) engagement system in the engaged state.

Referring now to FIG. 5, the transmission 10 is shown in the operating mode 138. In the mode 138, the second shaft splines 28 remain in the actuated position 36 attained in the operating mode 136. Additionally, in the mode 138, the second frustoconical engagement member 24 has moved in the direction opposite to the direction indicated by arrow 24A from the actuated position 32 attained in FIG. 4 to the de-actuated position 30.

Referring again to FIGS. 2-5, a method of operating the transmission 10 will now be described. The method includes actuating the primary engagement system actuator 42 to engage the second frustoconical engagement member 24 with the first frustoconical engagement member 22 to synchronize rotation of the first and second shafts 14, 16. The method further includes actuating the secondary engagement system actuator 82 to engage the second shaft splines 28 with the first shaft splines 26 to lock the shafts 14, 16 together upon synchronizing rotation of the shafts 14, 16. The method further still includes de-actuating the actuator 42 to disengage the engagement member 24 from the engagement member 22 upon locking the shafts 14, 16 together.

Referring yet again to FIGS. 2-5, the transmission 10 may include sensors that are configured to provide feedback to the controller 122 in each of the operating modes 130. Specifically, the sensors may provide electrical input to the controller 122 indicative of the positional state of components of each of the primary and secondary engagement systems 18, 20 in each mode 130. One sensor may be used to monitor the position of the primary engagement system actuator 42 within the channel 64 in each mode 130. Another sensor may be used to monitor the position of the secondary engagement system actuator 82 within the channel 100 in each mode 130. Yet another sensor may be used to monitor engagement between the first and second frustoconical engagement members 22, 24 in each mode 130. Yet another sensor still may be used to monitor engagement between the first and second shaft splines 26, 28 in each mode 130.

The sensors may be embodied as linear position sensors. For example, the sensors may be embodied as linear variable differential transformers (LVDTs), or the like. The sensors may also be embodied as switches such as, for example, reed switches, or the like. In any case, feedback provided to the controller 122 from the sensors may be used to detect failure of the primary and second engagement systems 18, 20 in operation of the transmission 10. In one instance, sensor input indicative of a failure of the primary engagement system actuator 42 may cause the controller 122 to direct movement of the secondary engagement system actuator 82 to engage the second shaft splines 28 with the first shaft splines 26. In another instance, sensor input indicative of a failure of the actuator 82 may cause the controller 122 to direct movement of the actuator 42 to engage the second frustoconical engagement member 24 with the first frustoconical engagement member 22.

Figure 6:
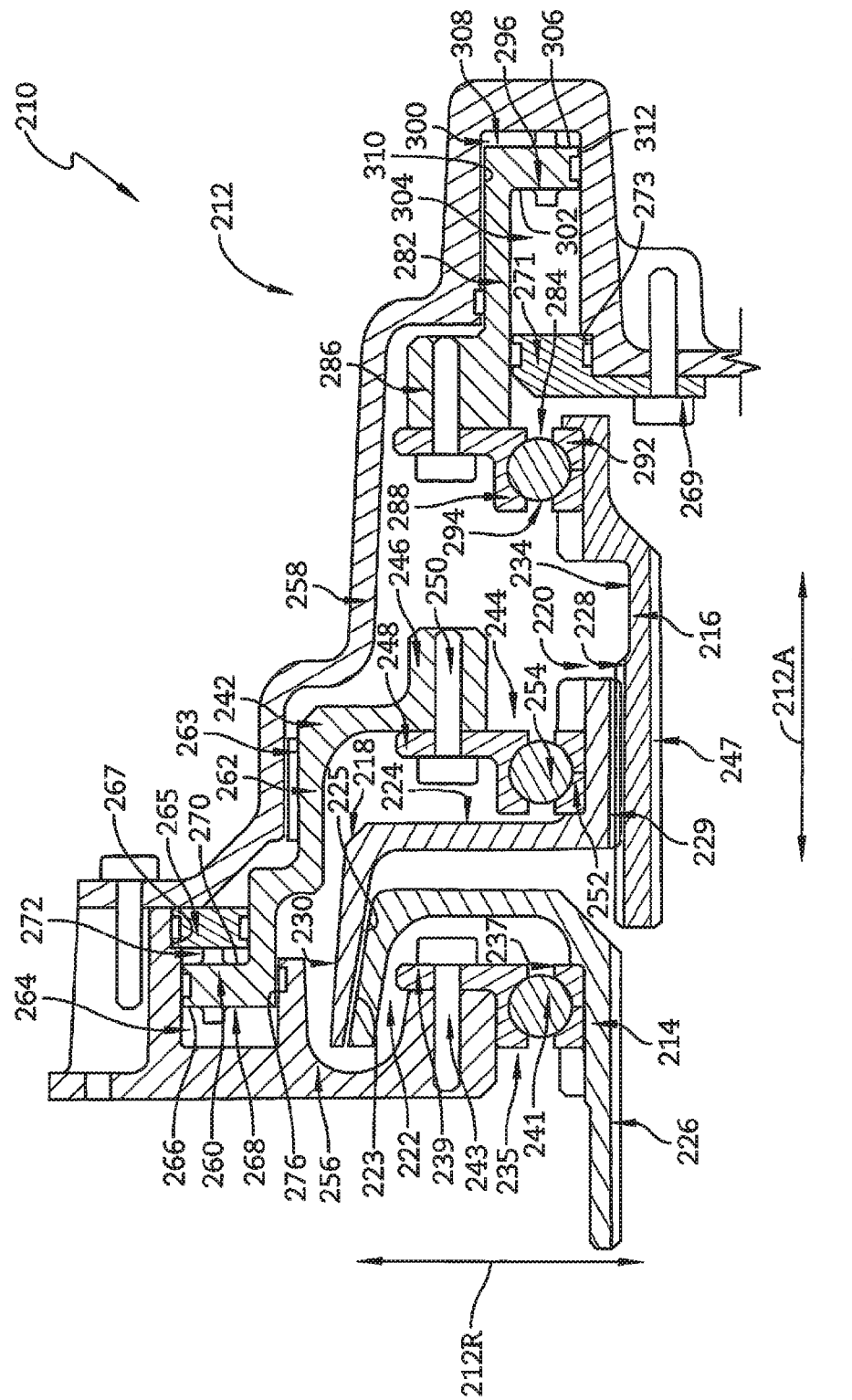
FIG. 6 is a cross-sectional view of another clutch included in a second transmission adapted for use in a gas turbine engine showing that the clutch includes a primary (friction-cone) engagement system and a secondary (splined) engagement system.

Referring now to FIG. 6, another clutch 212 included in an illustrative transmission 210 is shown. Unlike the primary engagement system actuator 42, a portion 262 of a primary engagement system actuator 242 of the clutch 212 includes an anti-rotation feature 263 as shown in FIG. 6. The anti-rotation feature 263 is illustratively embodied as a projection or spline that is configured to engage a complementary feature formed in a stationary element 258. Engagement of the anti-rotation feature 263 and the complementary feature constrains the actuator 242 against rotation relative to the element 258 with a second frustoconical engagement member 224.

Unlike the stationary elements 56, 58, stationary elements 256, 258 of the clutch 212 are engaged with a stop 265 that is received by a cutout 267 formed in the element 256 as shown in FIG. 6. The stop 265 is positioned in a channel 264 that is cooperatively defined by the elements 256, 258. The primary engagement system actuator 242 is also positioned in the channel 264, and the stop 265 abuts the elements 256, 258 and the portion 262 of the actuator 242. A fluid chamber 272 is defined between the stop 265 and a portion 260 of the actuator 242.

Unlike the stationary element 58, the stationary element 258 of the clutch 212 is coupled by a fastener 269 to a stop 271 that is received by a cutout 273 formed in the element 258 as shown in FIG. 6. The stop 271 is positioned in a channel 300 that is defined by the element 258. A secondary engagement system actuator 282 is also positioned in the channel 300, and the stop 271 abuts the element 258 and the actuator 282. A fluid chamber 304 is defined between the stop 271 and a portion 296 of the actuator 282.

The size of the secondary engagement system actuator 282 of the clutch 212 in a radial direction indicated by 212R illustratively differs from the size of the actuator 82 of the clutch 12 in a radial direction indicated by 12R as shown in FIG. 6. The actuator 282 is smaller in the radial direction indicated by 212R than the actuator 82 in the radial direction indicated by 12R.

The positioning of the channel 300 relative to bearings 235, 244, 284 of the clutch 212 illustratively differs from the positioning of the channel 100 relative to the bearings 35, 44, 84 of the clutch 112 as shown in FIG. 6. Whereas the channel 100 is positioned outward of the bearings 35, 44, 84 in the direction indicated by arrow 12R, the channel 300 is not positioned outward of the bearings 235, 244, 284 in the direction indicated by arrow 212R. Rather, the channel 300 is positioned substantially in line with the bearings 235, 244, 284 in the direction indicated by arrow 212R.

The number of stationary elements included in the clutch 212 illustratively differs from the number of stationary elements included in the clutch 112 as shown in FIG. 6. Whereas the clutch 112 includes the stationary elements 56, 58, 61, the clutch 212 includes only the stationary elements 256, 258. Thus, the number of stationary elements included in the clutch 212 is less than the number of stationary elements included in the clutch 112.

The package size of the clutch 212 illustratively differs from the package size of the clutch 12 as shown in FIG. 6. The package size of the clutch 212 is smaller than the package size of the clutch 12. Specifically, the clutch 212 is smaller in an axial direction indicated by arrow 212A than the clutch 12 in an axial direction indicated by arrow 12A, and the clutch 212 is smaller in the radial direction indicated by arrow 212R than the clutch 12 in the radial direction indicated arrow 12R.

The present disclosure is related to providing a lightweight, low-profile clutch with redundant engaging capabilities. The clutches disclosed herein may provide redundancy in a package that may weigh about 100 pounds.

The clutch, such as the clutches 12, 212 disclosed herein, may consist of a drive cone that may contain an internal spline, such as the members 22, 222 containing respective splines 26, 226. The clutch may also include a driven cone that may be connected through a bearing to a non-rotating primary engagement piston and may also slide along a spline connection with an internal engagement shaft, such as the members 24, 224 that are connected through bearings 44, 244 to actuators 42, 242 and slide relative to shafts 16, 216 via splines 29, 229. The clutch may also include a non-rotating locking piston that may be also connected through a bearing to the engagement shaft, such as the actuators 82, 282 connected through bearings 84, 284 to shafts 16, 216. The engagement shaft may have an internal spline that may be engaged to the driven shaft, such as the driven splines 47, 247.

The drive cone may rotate constantly when it is coupled to the drive shaft, such as the drive shaft 33. The driven shaft, the driven cone, and the engagement shaft may rotate at a non-synchronous speed to the drive shaft and the drive cone prior to engagement. To engage the clutch, hydraulic pressure may be applied to an aft side of the primary engagement piston, such as the walls 70, 270 of the actuators 42, 242. As a result, the driven cone may translate forward to engage the drive cone, which may in turn synchronize the drive shaft and the driven shaft, like the synchronization associated with the primary engagement systems 18, 218. Hydraulic pressure may then be applied to the aft side of the locking piston, such as the walls 106, 306 of the actuators 82, 282. As a result, the engagement shaft may translate forward to engage the inner spline of the drive cone, which may in turn lock the driven shaft to the drive shaft, like the locking associated with the secondary engagement systems 20, 220. Pressure may then be relieved from the primary engagement piston.

In the unlikely event of a primary engagement piston failure during an engagement sequence, a secondary method of engagement may be employed in which the engagement shaft may directly engage the drive cone spline. This may be accomplished through repeated actuation of the lock piston if necessary, in order to achieve suitable spline alignment. Feedback of spline engagement and piston movement may be provided to a control unit through the use of a reed switch or LVDT.

In the unlikely event of a failure of the locking piston, the pressure behind the primary engagement piston may be maintained. In this way, engagement between the drive shaft and the driven shaft may be maintained by the clutch.

It may also be possible to incorporate composite materials into the concept disclosed herein, along with nano-crystalline coatings. Such materials may ultimately have the potential to not only reduce weight of the clutch unit, but also reduce cost.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A clutch comprising
a first shaft,
a second shaft,
a primary engagement system configured to selectively transmit rotation from the first shaft to the second shaft, the primary engagement system including a first frustoconical engagement member coupled for common rotation with the first shaft and a second frustoconical engagement member coupled for common rotation with the second shaft, and
a secondary engagement system configured to selectively transmit rotation from the first shaft to the second shaft, the secondary engagement system including first shaft splines coupled to the first shaft for movement therewith and second shaft splines coupled to the second shaft for movement therewith,
wherein the second frustoconical engagement member of the primary engagement system is coupled to the second shaft to slide relative to the second shaft from a first position disengaged from the first frustoconical engagement member to a second position engaged with the first frustoconical engagement member.

2. The clutch of claim 1, wherein the second shaft splines are mounted to slide with the second shaft from a first position disengaged from the first shaft splines to a second position engaged with the first shaft splines.

3. The clutch of claim 1, wherein the primary engagement system includes slide splines coupled to the second frustoconical engagement member for movement therewith, the slide splines intermeshed with the second shaft splines to couple the second frustoconical engagement member to the second shaft for rotation therewith while allowing the second frustoconical engagement member to slide relative to the second shaft.

4. The clutch of claim 3, wherein the second frustoconical engagement member forms an internal engagement surface that contacts the first frustoconical engagement member when the second frustoconical engagement member is in the second position.

5. The clutch of claim 1, wherein the first shaft splines are internal splines and the second shaft splines are external splines.

6. The clutch of claim 5, wherein the primary engagement system includes internal slide splines coupled to the second frustoconical engagement member for movement therewith, the internal slide splines intermeshed with the second shaft splines to couple the second frustoconical engagement member to the second shaft for rotation therewith while allowing the second frustoconical engagement member to slide relative to the second shaft.

7. The clutch of claim 1, wherein the first frustoconical engagement member is integrally formed with the first shaft.

8. The clutch of claim 1, wherein the first frustoconical member, the first shaft, and the first shaft splines are integrally formed with one another.

9. A clutch comprising
a first shaft,
a second shaft,
a primary engagement system configured to selectively transmit rotation from the first shaft to the second shaft, the primary engagement system including a first frustoconical engagement member coupled for common rotation with the first shaft, a second frustoconical engagement member coupled for common rotation with the second shaft, and a primary engagement system actuator coupled to the second frustoconical engagement member and configured to move the second frustoconical engagement member from a de-actuated position disengaged from the first frustoconical engagement member to an actuated position engaged with the first frustoconical engagement member, wherein the second frustoconical engagement member is coupled to the second shaft to slide relative to the second shaft, and
a secondary engagement system configured to selectively transmit rotation from the first shaft to the second shaft, the secondary engagement system including first shaft splines coupled to the first shaft for movement therewith, second shaft splines coupled to the second shaft for movement therewith, and a secondary engagement system actuator coupled to the second shaft and configured to move the second shaft splines from a de-actuated position disengaged from the first shaft splines to an actuated position engaged with the first shaft splines.

10. The clutch of claim 9, wherein the primary engagement system actuator and the secondary engagement system actuator are independent of one another so that the second frustoconical engagement member and the second shaft splines are movable between their respective de-actuated and actuated positions independently of one another.

11. The clutch of claim 9, wherein the primary engagement system includes slide splines coupled to the second frustoconical engagement member for movement therewith, the slide splines intermeshed with the second shaft splines to couple the second frustoconical engagement member to the second shaft for rotation therewith while allowing the second frustoconical engagement member to slide relative to the second shaft.

12. The clutch of claim 9, wherein the first shaft splines are internal splines and the second shaft splines are external splines.

13. The clutch of claim 12, wherein the primary engagement system includes internal slide splines coupled to the second frustoconical engagement member for movement therewith, the internal slide splines intermeshed with the second shaft splines to couple the second frustoconical engagement member to the second shaft for rotation therewith while allowing the second frustoconical engagement member to slide relative to the second shaft.

14. The clutch of claim 9, wherein the first frustoconical engagement member is integrally formed with the first shaft and the first shaft splines are arranged radially inward of the first frustoconical engagement member.

15. A transmission comprising
a source of hydraulic fluid,
a first shaft,
a second shaft,
a frictional engagement system configured to selectively transmit rotation from the first shaft to the second shaft, the frictional engagement system including a first engagement member coupled for common rotation with the first shaft, a second engagement member coupled for common rotation with the second shaft, and a frictional engagement system actuator coupled to the second engagement member and configured to move the second engagement member from a de-actuated position disengaged from the first engagement member to an actuated position engaged with the first engagement member,
wherein the first engagement member comprises a first frustoconical engagement member and the second engagement member comprises a second frustoconical engagement member,
a fixed engagement system configured to selectively transmit rotation from the first shaft to the second shaft, the fixed engagement system including first shaft splines coupled to the first shaft for movement therewith, second shaft splines coupled to the second shaft for movement therewith, and a fixed engagement system actuator coupled to the second shaft and configured to move the second shaft splines from a de-actuated position disengaged from the first shaft splines to an actuated position engaged with the first shaft splines, and
a controller, the controller including a processor and memory having instructions stored therein that are executable by the processor to pressurize hydraulic fluid supplied by the source to cause at least one of the (i) the frictional engagement system actuator to move from the de-actuated position to the actuated position and (ii) the fixed engagement system actuator to move from the de-actuated position to the actuated position.

16. The transmission of claim 15, wherein the memory includes instructions that are executable by the processor to pressurize hydraulic fluid supplied by the source to cause (i) the frictional engagement system actuator to move from the de-actuated position to the actuated position to synchronize rotation of the first and second shafts and (ii) the fixed engagement system actuator to move from the de-actuated position to the actuated position to lock the first and second shafts together upon synchronization of the first and second shafts after movement of the second engagement member to the actuated position.

17. The transmission of claim 16, wherein the memory includes instructions that are executable by the processor to pressurize hydraulic fluid supplied by the source to cause the frictional engagement system actuator to move from the actuated position to the de-actuated position after movement of the second shaft splines to the actuated position.

18. The transmission of claim 15, wherein the frictional engagement system actuator is constrained against rotation with the second engagement member, and the fixed engagement system actuator is constrained against rotation with the second shaft.

* * * * *